United States Patent [19]

Rehmer

[11] Patent Number: 5,047,443
[45] Date of Patent: Sep. 10, 1991

[54] HOTMELT CONTACT ADHESIVES WHICH CAN BE CROSSLINKED WITH ULTRAVIOLET RADIATION IN THE PRESENCE OF OXYGEN

[75] Inventor: Gerd Rehmer, Bobenheim-Roxheim, Fed. Rep. of Germany

[73] Assignee: BASF Aktiengesellschaft, Ludwigshafen, Fed. Rep. of Germany

[21] Appl. No.: 353,460

[22] Filed: May 18, 1989

[30] Foreign Application Priority Data

May 21, 1988 [DE] Fed. Rep. of Germany ....... 3817452

[51] Int. Cl.$^5$ .................. C08F 2/46; C08F 24/00; C08G 3/00; C08J 3/28
[52] U.S. Cl. .................. 522/46; 522/120; 522/121; 522/154; 525/327.2
[58] Field of Search .............. 522/46, 120, 121, 154; 525/327.2

[56] References Cited

U.S. PATENT DOCUMENTS

| | | | |
|---|---|---|---|
| 3,229,478 | 1/1966 | Alonso | 62/371 |
| 4,045,517 | 10/1977 | Guerin et al. | 525/203 |
| 4,052,527 | 10/1977 | Pastor et al. | 428/463 |
| 4,133,731 | 1/1979 | Hansen et al. | 204/159.17 |
| 4,243,500 | 1/1981 | Glennon | 522/46 |
| 4,438,177 | 3/1984 | Potter et al. | 428/355 |
| 4,452,955 | 6/1984 | Boeder | 525/518 |
| 4,477,636 | 10/1984 | Muroi et al. | 522/104 |

FOREIGN PATENT DOCUMENTS

| | | |
|---|---|---|
| 2357486 | 5/1975 | Fed. Rep. of Germany |
| 2838691 | 3/1979 | Fed. Rep. of Germany |
| 3220875 | 12/1983 | Fed. Rep. of Germany |
| 0208856 | 1/1987 | Fed. Rep. of Germany |

*Primary Examiner*—Marion E. McCamish
*Assistant Examiner*—Mark A. Chapman
*Attorney, Agent, or Firm*—Oblon, Spivak, McClelland, Maier & Neustadt

[57] ABSTRACT

Hotmelt contact adhesives which are crosslinkable with UV light in the air are based on copolymers which contain tetrahydrofurfur-2-yl (meth)acrylate and/or N-2-tetrahydrofurfuryl (meth)-acrylamide and/or alkoxyalkyl (meth)acrylates and/or N-alkoxyalkyl (meth)acrylamides as copolymerized units and added benzophenone and/or benzophenone derivatives as photosensitizers.

5 Claims, No Drawings

HOTMELT CONTACT ADHESIVES WHICH CAN BE CROSSLINKED WITH ULTRAVIOLET RADIATION IN THE PRESENCE OF OXYGEN

The present invention relates to hotmelt contact adhesives which can be crosslinked with UV light in the air and have improved tack and peeling strength and very good adhesion even to metals.

Contact adhesives should possess permanent tack, good flow behavior on various surfaces and a balance between adhesion and cohesion. As a rule, contact adhesives are used to coat sheet-like substrates and thus to produce, for example, self-adhesive tapes or self-adhesive labels. Frequently, the contact adhesive has to be applied as a solution in organic solvents to the particular substrate and the solvent then evaporated off, so that in general a recovery plant is required for the solvents, since otherwise solvent vapors would cause considerable environmental pollution.

Although disadvantages of this type are avoided when aqueous contact adhesive dispersions are used, the drying of aqueous formulations requires large amounts of energy and permits only relatively low production rates.

The most advantageous method of applying contact adhesives is to apply a melt of the adhesive, since in this case no solvents have to be separated off.

The contact adhesives used here are, for example, block polymers of styrene and isoprene or butadiene, as described in, for example, U.S. Pat. No. 3,229,478. However, hotmelt adhesives of this type require temperatures of, in general, more than 180° C. to ensure that they possess sufficient flow during the coating process. Furthermore, these polymers have little resistance to atmospheric oxygen, heat, light and solvents. Hotmelt adhesives of this type also have only poor heat distortion resistance.

Attempts have therefore already been made to prepare contact adhesives from liquid polymer blends. The use of polyesters as a base material for contact adhesives in a reactive system is disclosed in, for example, German Patent 3,220,875, where hydroxypolyesters are reacted with alkoxysilyl compounds to give crosslinkable polymers, which, however, still undergo crosslinking too slowly at 100° C. Reactive systems of this type all have many difficulties, such as the exact metering of the reactive components, their inadequate reaction rate and in particular the poor reproducibility of the properties of the contact adhesive coating. In all reactive systems, it is also difficult to achieve a balance between adhesion and cohesion of the adhesive. During storage of the self-adhesive products, subsequent reactions are often observed, which may lead to considerable changes in the properties and even to a loss of tack.

DE-A 2 838 691 furthermore discloses radiation-curable materials which are based on polyacrylates and are suitable, inter alia, as adhesives for laminates. However, these have insufficient tack. Furthermore, DE-A-3 421 826 proposes urethane/urea/acrylate resins which are crosslinkable by UV radiation and have a long shelf life and can be used as coatings having good adhesion to various substrates. Finally, U.S. Pat. No. 4,133,731 discloses radiation-crosslinkable adhesives which have good heat distortion resistance and solvent resistance and consist of blends of, in particular, styrene/butadiene block copolymers, a tackifying resin and polyol acrylates. However, high contents of still unbonded esters of methacrylic acid are disadvantageous during processing and may give rise to flammable vapors which furthermore irritate the mucus membrane and have a pronounced odor. Even after the polymerization, relatively high contents of residual monomers are still detectable in the adhesive in these systems.

This also applies to the process for the production of self-adhesive coatings according to DE-A 2 357 486, in which a syrup, consisting of an acrylate copolymer, monomeric acrylates, a diolefinically or polyolefinically unsaturated monomeric compound, such as trimethylolpropane triacrylate, and a photosensitizer, e.g. methylolbenzoin methyl ether, acetophenone or benzophenone, is exposed to UV light after application to a film. Although these contact adhesives exhibit good surface tack at room temperature, they have pronounced flow and insufficient shearing strength at fairly high temperatures.

The radiation-curable hotmelt contact adhesives of U.S. Pat. No. 4,052,527, based on polyacrylate, can only be processed at high temperatures and require high radiation doses for crosslinking, resulting in damage to the substrate. The polyacrylate hotmelt contact adhesives of U.S. Pat. No. 4,438,177 also have these disadvantages, apart from the high processing temperature. Furthermore, DE-A 3 613 082 describes hotmelt adhesives based on radiation-crosslinkable polyesters which have acrylate and/or methacrylate groups and possess good tack; however, these products have poor heat distortion resistance. Moreover, the preparation process for these products is very expensive.

A particular disadvantage of the known coatings crosslinkable with UV light is their sensitivity to oxygen during the crosslinking reaction, since oxygen inhibits polymerization, so that in some cases insufficient crosslinking is achieved and greasy surfaces are obtained. To avoid these disadvantages, exposure to UV light is generally carried out under inert gases, for example under nitrogen, noble gases or carbon dioxide. However, this requires very complicated apparatus.

There is therefore a need for hotmelt contact adhesives which can be crosslinked in the air, are free of solvents and unsaturated monomers, have little odor, show little tendency to discoloration and are as far as possible colorless, have a sufficiently low melt viscosity at temperatures of, preferably, from 20° to 150° C. and, in the crosslinked state, possess good tack, high shearing strength and high peeling strength.

We have found that hotmelt contact adhesives based on (A) copolymers which have a K value of from 8 to 60 and are prepared by solution copolymerization of
  (a) from 0.1 to 20%, based on the weight of the copolymers, of tetrahydrofurfur-2-yl (meth)acrylate and/or N-2-tetrahydrofurfuryl (meth)acrylamide and/or alkoxyalkyl (meth)acrylates and/or N-alkoxyalkyl (meth)acrylamides,
  (b) from 44 to 99.9%, based on the weight of the copolymers, of monoolefinically unsaturated acyclic unsubstituted monocarboxylates of 3 to 12 carbon atoms, not more than 20% by weight of which may be replaced by vinyl ethers of 3 to 20 carbon atoms, styrene, α-methylstyrene, vinyl chloride, vinylidene chloride and/or acrylonitrile,
  (c) from 0 to 30%, based on the weight of the copolymers, of monoolefinically unsaturated compounds of 4 to 25 carbon atoms which have one or more ester, carboxamide or carboximide groups, one of which is adjacent to the olefinic double bond, and from 1 to 3 carboxyl groups, and (d) from 0 to 6%, based on the weight of the copolymers, of α,β-monoolefinically unsaturated mono- and/or di-carboxylic acids of 3 to 6 carbon atoms and/or their anhydrides at from 70° to 150° C. in the presence of from 0.25 to 10% by weight, based on the monomers, of a ketone peroxide as a polymerization initiator and from 15 to 200% by weight, based on the monomers, of inert solvents, and removal of the solvents during or after the polymerization, and (B) from 0.01 to 10% by weight, based on the sum of the components (A) and (B), of benzophenone and/or benzophenone derivatives can be crosslinked with ultraviolet radiation in the air.

Preferred monomers (a) for the copolymers (A) are tetrahydrofurfur-2-yl acrylate and tetrahydrofurfur-2-yl methacrylate. Other suitable monomers are N-2-tetrahydrofurfurylacrylamide and -methacrylamide and alkoxyalkyl (meth)acrylates and alkoxyalkyl (meth)acrylamides, which generally have 1 to 8, preferably 1 to 4, carbon atoms in the alkyl groups, methoxy compounds being preferred. Examples of these are 3-methoxybutyl (meth)acrylate, 2-methoxyethyl acrylate and methacrylate, 2-butoxyethyl acrylate and methacrylate, 2-ethoxyethyl acrylate and methacrylate, N-n-butoxymethylacrylamide and -methacrylamide and N-isobutoxymethylacrylamide and -methacrylamide and N-methoxyethylacrylamide and -methacrylamide. The copolymers (A) contain the monomers (a) as copolymerized units preferably in an amount of from 2 to 15% by weight.

The copolymers of (A) contain monoolefinically unsaturated acyclic unsubstituted monocarboxylates of 3 to 12 carbon atoms, in particular esters of acrylic and methacrylic acid and vinyl esters, as copolymerized monomers (b). Particularly important monomers (b) are the acrylates and methacrylates of alkanols of 2 to 8 carbon atoms, in particular methyl acrylate, ethyl acrylate, n-butyl acrylate and methacrylate, isobutyl acrylate and methacrylate, isoamyl acrylate and methacrylate and 2-ethylhexyl acrylate and methacrylate. Other suitable monomers are propyl acrylate and isopropyl acrylate, methyl methacrylate (in small amounts) and decyl acrylate and methacrylate and dodecyl acrylate and methacrylate. Particularly suitable vinyl esters are vinyl propionate, and vinyl acetate, vinyl formate and vinyl butyrate are also useful. The copolymerized esters of acrylic and/or methacrylic acid with alkanols of 2 to 8 carbon atoms are present in particular in an amount of from 56 to 92.9%.

Up to 20% by weight of the monomers (b) can be replaced by vinyl ethers of 3 to 20 carbon atoms, such as vinyl methyl ether, vinyl propionate, vinyl 2-ethylhexanoate, styrene, α-methylstyrene, vinyl chloride, vinylidene chloride and/or acrylonitrile, styrene and acrylonitrile and amounts of not more than 10% by weight being of particular interest.

Monomers (c), which may be present as copolymerized units in the copolymers (A) in an amount of not more than 30, preferably from 5 to 25%, by weight, are, for example, succinic monoesters and/or monoesters of benzenedicarboxylic and/or benzenetricarboxylic acids with polyhydroxyalkyl mono(meth)acrylates, such as 2-hydroxyalkyl mono(meth)acrylates, and/or reaction products of maleic anhydride with hydroxycarboxylic acids and/or aminocarboxylic acids and/or maleimido-N-carboxylic acids, such as maleimido-N-hexanoic acid, and/or reaction products of glycidyl (meth)acrylate and aminocarboxylic acids. Of particular interest are succinic monoesters of alkanediol monoacrylate and monomethacrylates, such as 1,2-ethanediol monoacrylate and methacrylate, 1,4-butanediol monoacrylate and methacrylate, 1,6-hexanediol acrylate and methacrylate and 1,8-octanediol monoacrylate and monomethacrylate, as well as 1,2-propanediol monoacrylate and monomethacrylate. Alkanediol mono(meth)acrylates of this type preferably have 2 to 4 carbon atoms in the alkanediol radical. The concomitant use of monomers (c) for the copolymers (A) is of particular advantage for increasing the peeling strength and reducing the melt viscosity.

Finally, it is sometimes advantageous, for example for increasing the adhesion to metal surfaces, if the copolymers (A) contain not more than 6%, based on the weight of the copolymers, of α,β-olefinically unsaturated mono- and/or dicarboxylic acids of 3 to 6 carbon atoms and/or their anhydrides as copolymerized units. A content of from 0.5 to 3% of these monomers (b) is generally of particular interest. Examples of such monomers are, in particular, acrylic acid, methacrylic acid, itaconic acid, fumaric acid and maleic anhydride. In some cases, other monoolefinically unsaturated monomers (b) which contain functional groups, e.g. acrylamide, methacrylamide, 2-hydroxyethyl acrylate and methacrylate, 4-hydroxybutyl acrylate and methacrylate and glycidyl acrylate and methacrylate, are suitable as additional monomers in small amounts, which are generally from 0 to 3%, based on the copolymer (A).

The copolymers (A) are prepared at from 70° to 120° C., preferably from 80° to 110° C., in the presence of from 0.25 to 10% by weight, based on the monomers, of a ketone peroxide as a polymerization initiator and from 15 to 200, preferably from 30 to 50%, by weight, based on the monomers of inert solvents, by solution polymerization. Particularly suitable ketone peroxides are methyl ethyl ketone peroxide, acetyl acetone peroxide, cyclohexanone peroxide and methyl isobutyl ketone peroxide.

Methyl isobutyl ketone peroxide and cyclohexanone peroxide are particularly important ketone peroxides.

If other conventional polymerization initiators are used in the preparation of the copolymers (A), the resulting copolymers have a relatively high gel content and are therefore not very suitable for the preparation of hotmelt contact adhesives. Furthermore, hotmelt contact adhesive which are rapidly crosslinkable by exposure to UV light are not obtained if other aromatic ketones usually used as photosensitizers, such as benzoin or acetophenone, or other types of conventional photoinitiators are used under similar conditions.

Preferably used solvents are those which have a boiling range of from 50° to 150° C. and may furthermore contain small amounts of high boiling or low boiling components. Examples of suitable substances are hydrocarbons, such as toluene and gasolines which preferably have a boiling range of from 60° to 120° C. Particularly interesting solvents are alcohols, such as methanol, ethanol, n-propanol and isopropanol, isopropanol and isobutanol and mixtures of these, being particularly preferred, especially isopropanol. Other suitable solvents are ketones, such as acetone or methyl ethyl ketone, and esters, such as ethyl acetate, or mixtures of these or mixtures with isopropanol and isobutanol, whose content in this case is advantageously not less than 5, particularly preferably 25%, by weight, based on the solvent mixture.

To carry out the polymerization, conventional regulators may also be added to the reaction mixture, for example secondary alcohols, mercaptans, such as mercaptoethanol, mercaptosuccinic acid, mercaptoglycerol or 3-mercaptopropyltrimathoxysilane, ethers, such as dioxane and tetrahydrofuran, hydrocarbons, such as isopropylbenzene, and compounds such as bromoform and carbon tetrachloride. Regulators of this type can be added to the reaction mixture in amounts of from 0.01 to 50% by weight, based on the sum of the solvents and regulators.

The polymerization is carried out in a conventional manner in a polymerization apparatus which is generally provided with a stirrer, a plurality of feed vessels and a reflux condenser. In general, a kettle is used, but a plurality of kettles connected in series, i.e. a kettle cascade, can also be employed, the last kettle being connected to a suitable apparatus for removing solvents, for example a falling film evaporator. In a kettle cascade, the starting materials are generally added continuously, and the product is likewise removed continuously. The solvent can be distilled off gradually during the polymerization itself, in general after a conversion of about 40-50%, or after the end of the polymerization, if necessary with a reduction in the pressure or an increase in the boiling point of the mixture. In general, the polymerization is carried out by initially taking some of the solvent and of the monomer mixture and some of the polymerization initiator in a kettle flushed with nitrogen. The reaction mixture is then heated to the boil, the boiling point being kept at the desired level if necessary by employing reduced or superatmospheric pressure. The amount of polymerization initiator is preferably from 0.1 to 6% by weight, based on the total amount of monomers. After an initial polymerization phase, the remaining monomer mixture and any further polymerization initiator and any further solvent are added. The polymerization temperature is kept preferably below 120° C., particularly preferably below 100° C., in particular below 80° C. After the end of the polymerization, the solvent is generally evaporated off in the polymerization kettle, solvent residues being removed under reduced pressure, if necessary at elevated temperatures. The copolymer (A) is then generally discharged from the polymerization apparatus in the form of a melt. However, it is also advantageous in some cases to separate off the solvent in downstream apparatuses, for example in a falling film evaporator.

The copolymers (A) obtained generally have a K value of from 8 to 60, measured at 25° C. in 1% strength solution in tetrahydrofuran (according to DIN 53,726), and K values of from 12 to 60, in particular from 16 to 40, are of particular interest. Their glass transition temperatures in the uncrosslinked state are preferably below 0° C., in particular below −10° C. To prepare the hotmelt contact adhesive crosslinkable with ultraviolet radiation, from 0.01 to 10, in particular from 0.05 to 5, preferably from 0.1 to 2%, by weight, based on the copolymer (A), of benzophenone and/or benzophenone derivatives are then furthermore incorporated into the copolymers (A). Particularly suitable benzophenone derivatives are hydroxyphenones, such as 3-hydroxybenzophenone and 4-hydroxybenzophenone, and benzophenonecarboxylic acids, such as benzophenone-2-carboxylic acid, benzophenone-3-carboxylic acid, benzophenone-4-carboxylic acid and 3,3′,4,4′-benzophenonetetracarboxylic acid. 3,3′,4,4′-Benzophenonetetracarboxylicdianhydride,3,3′,4,4′-tetra(tert-butylperoxycarbonyl)-benzophenone, 2-, 3- and 4- alkylbenzophenones where alkyl is of 1 to 10 carbon atoms, such as 2-, 3- and 4-methylbenzophenone, and 2-, 3- and 4-nonylbenzophenone, dialkylbenzophenones, such as 4,4′-diisopropyl-benzophenone, and halo(monoalkyl)benzophenones, such as 4-trifluoromethylbenzophenone, and 3,3′-dimethyl-4-methoxybenzophenone, 4-aminobenzophenone, 4-aminobenzophenone hydrochloride, sulfate and bisulfate, 4,4′-tetramethylaminobenzophenone and olefinically unsaturated benzophenone derivatives, as available commercially under the trade names ®Uvecryl P 36 (UCB). In some cases, it is advantageous to add benzophenone and/or benzophenone derivatives of the stated type to the copolymer (A) directly after its preparation, provided that, for example, solvent is still present in the polymerization mixture to ensure a particularly uniform distribution of the two components in one another.

In some cases, it has proven advantageous also to add from 1 to 25, in particular from 2 to 10%, by weight, based on the components (A) and (B), of (C) polyolefinically unsaturated polyethers and/or polyesters having a mean molecular weight (number average) of from 250 to 5,000 to the novel hotmelt contact adhesives. Examples of suitable substances are polyetherols and polyesterols reacted with acrylic acid, as are commercially available under the trade names ARONIX ® M-6100, M-6200, M-6250, M-7100 and M-8030 (Toagosei Chemical Ind.). Other suitable polyetherols are tripropylene glycol diacrylate, tetraethylene glycol diacrylate and diacrylates of polyethylene glycols and polypropylene glycols. The polyunsaturated polyethers added are, in particular, diacrylates and dimethacrylates of polytetrahydrofurans, where the polytetrahydrofurans may have molecular weights of, for example, 250, 650, 1,000 or 2,000. Such polyolefinically unsaturated polyethers and/or polyesters are generally preferred as component (C) although monoolefinically unsaturated polyetherols, for example monoacrylates or monomethacrylates of oxyethylated and/or oxypropylated alkanols, such as the commercial products ARONIX ® M-101 and M-111 (Toagosei Chemical Ind.), are also suitable. By the addition of such components (C), in many cases the melt viscosity of the hotmelt contact adhesive and the heat distortion resistance of crosslinked adhesive bonds are improved and, when diacrylates or dimethacrylates of polytetrahydrofurans are used, crosslinked products which possess surprisingly high gloss are obtained. The addition of diolefinically unsaturated polytetrahydrofurans to the hotmelt contact adhesives is therefore preferred.

In some cases, if the copolymers A contain from 10 to 25%, based on the weight of the copolymer, of monomers C) as copolymerized units, it is particularly advantageous also to add from 0.05 to 0.5% by weight, based on the components (A), (B) and (C), of a reducing agent (D) to the hotmelt contact adhesives.

Preferred components (D) are cobalt(II) salts, such as Co(II) octoate, Co(II) naphthenate, Co(II) acetylacetonate, Co(II) acetate or Co(II) phthalocyanine, manganese(II) salts, such as Mn(II) acetate or Mn(II) acetylacetonate, vanadium(III) and (IV) salts, such as vanadium(III) acetylacetonate and vanadium(IV) oxyacetylacetonate, redox systems, such as Fe(III) salts, e.g. iron(II) oxalate, in combination with, for example, glucose, quaternary ammonium salts, such as tetra-n- butylammonium bromide or tetra-n-butylammonium iodide, and alkali metal and/or alkaline earth metal bromides and iodides, e.g. potassium iodide and magnesium bromide, hydroquinone, hydroquinone monomethyl ether, di-tert-butyl p-cresol, tert-butyl catechol, sodium diethyl dithiocarbamate, diethyl thiocarbamate, hydroxymethanesulfinic acid and, for example, the sodium salt of hydroxymethanesulfinic acid, aliphatic and/or aromatic tertiary amines, such as dimethylaniline, diethylaniline and dimethyl-p-toluidine.

The components (D) are added to the components (A), (B) and (C) in general after they have been mixed, although they can also first be added together with one of the other components, for example copolymers of (A) (after its preparation and preferably before the solvents have been separated off).

The novel materials can be modified and/or compounded in a conventional manner. For example, conventional tackifying resins, e.g. hydrocarbon resins, unmodified or modified rosins, terpene/phenol resins, ketone resins, aldehyde resins or homopolymers, such as poly-2-ethylhexyl acrylate and poly-n-butyl acrylate, or plasticizers, for example those based on mono-, di- or polyester compounds, polychlorinated hydrocarbons or liquid paraffins, dyes, pigments or stabilizers or elastomeric substances, such as natural or synthetic rubber, polyvinyl ether and polybutadiene oils, can be added in small amounts.

The novel hotmelt contact adhesives can be processed in a conventional manner. In general, melt temperatures of 80° to 150° C. are sufficient. The viscosity of the novel hotmelt contact adhesives in this temperature is about 6-60 Pa.s. The melts can readily be applied to sheet-like structures, such as films, paper and cardboard as well as wood and metals, with the aid of a conventional applicator, for example a sheet die. Films which are suitable as substrates may consist of, for example, polyethylene, polyamides, polyethylene glycol terephthalate, polypropylene, polyvinyl chloride or aluminum. The coatings obtained using the hotmelt contact adhesives can be crosslinked by exposure to ultraviolet light in the air to give coatings which have good adhesive properties and high cohesion and good peeling strength in combination with excellent aging resistance. Carrying out the procedure under inert gas atmosphere is not necessary and also has no advantages. Irradiation can be carried out using the conventional UV lamps, for example low pressure and high pressure Hg lamps which have powers of up to 100 W/cm or more.

The adhesive properties of sheet-like substrates which have a contact adhesive layer can be determined by measuring the shearing strength as a measure of the cohesion, and the peeling strength as an overall measure of cohesion and surface tack.

For the test, films of polyethylene glycol terephthalate and polypropylene are coated in an amount of 25 g/m². The solutions are evaporated off for 1 minute at 70° C. and under 1 bar. The coated films are exposed to light from a high pressure mercury lamp having a power of 80 watt/cm.

The films are then placed on a continuously revolving belt so that they pass under the lamp at a distance of 15 cm at a speed of 10 m/min; the irradiation process is repeated once. Irradiation is carried out in the air.

2 cm wide strips are cut from the films produced in this manner, and these strips are applied to a chromium-plated brass sheet. The sheet with the strips is then stored for 24 hours at 23° C. at 65% relative humidity.

To measure the peeling strength, the test strips are peeled off backward and parallel to the adhesive layer at a speed of 300 mm/min. The force required for this purpose is measured.

In the measurement of the shearing strength, a test strip having an area of 20 mm×45 mm is stuck to a chromium-plated brass sheet, which is clamped vertically, and the projecting part of the adhesive strip is loaded with a weight of 1 kg. The time taken to break the adhesive bond is determined. The measurement is carried out at 23° C. All measurements are carried out in triplicate.

In the Examples which follow, parts and percentages are by weight. The K values are determined according to DIN 53,726, in 1% solution in tetrahydrofuran as the solvent at 25° C. The melt viscosities of the copolymers are determined using a rotational viscometer with a cone-and-plate system (Haake, Karlsruhe) at the stated temperature; the shearing rate D is 100 1/s.

EXAMPLE 1

A mixture of 200 parts of isopropanol, 4 parts of methyl ethyl ketone peroxide and 320 parts of a monomer mixture of 735 parts of 2-ethylhexyl acrylate, 140 parts of n-butyl acrylate, 25 parts of acrylic acid and 100 parts of tetrahydrofurfur-2-yl acrylate is subjected to initial polymerization under reflux. After 20 minutes, the remainder of the monomer mixture and, at the same time, a mixture of 16 parts of methyl ethyl ketone peroxide and 50 parts of isopropanol are added in the course of 2 hours, after which the refluxing mixture is stirred for a further 4 hours. A clear gel-free solution of a copolymer (A1) having a K value of 25 is obtained. The solvent is distilled off from the solution at 130° C., in the final stages under reduced pressure (0.1 bar).

100 pars of the copolymer (A1) are mixed with 2 parts of benzophenone at 60° C. The resulting hotmelt contact adhesive is used to coat a polyethylene terephthalate film in such a way that a layer thickness of 25 μm is obtained. The film is then exposed to ultraviolet light in the air in the manner stated. A self-adhesive film having a good adhesive strength is obtained. The shearing strength at 23° C. is greater than 100 hours, and the peeling strength after 24 hours is 5.5 N/2 cm.

COMPARATIVE EXPERIMENT 1

For comparison, the preparation of the copolymer is repeated as described in Example 1, with the proviso that, instead of the methyl ethyl ketone peroxide, the same amount of lauroyl peroxide is used. An uncrosslinked, gel-containing copolymer (A1) which is unsuitable for hotmelt contact adhesives is obtained.

Copolymer (A2)

A mixture of 100 parts of isopropanol, 1 part of methyl ethyl ketone peroxide and 160 parts out of a total of 500 parts of a monomer mixture of 367.5 parts of 2-ethylhexyl acrylate, 75 parts of the reaction product of 1,4-butanediol monoacrylate with succinic anhydride, 12.5 parts of acrylic acid and 45 parts of tetrahydrofurfur-2-yl acrylate is heated to the boil. The remainder of the monomer mixture is added in the course of 2 hours under reflux. Thereafter, a mixture of 7.5 parts of methyl ethyl ketone peroxide and 25 parts of toluene is run in over 1 hours and stirring is continued for a further 4 hours with gentle refluxing.

The solvent and volatile components are removed at 120° C., initially under atmospheric pressure and then under reduced pressure (0.1 bar).

A copolymer (A2) having a K value of 18 is obtained. The melt viscosity at 80° C. is 8 Pa.s.

Copolymer (A3)

A mixture of 100 parts of isopropanol, 1 part of cyclohexanone peroxide and 160 parts of a monomer mixture of 380 parts of 2-ethylhexyl acrylate, 75 parts of the reaction product of 1,2-ethanediol monoacrylate with succinic anhydride and 45 parts of tetrahydrofurfur-2-yl acrylate is refluxed. The remainder of the monomer mixture is added in the course of 2 hours, the reaction mixture being kept under reflux, stirring is then continued for 30 minutes and 57.5 parts of a mixture of 7.5 parts of cyclohexanone peroxide, 25 parts of toluene and 25 parts of isopropanol are then added and refluxing is continued for a further 5 hours.

The solvent and volatile components are removed as stated for copolymer (A2). A copolymer (A3) which has a K value of 21 and a viscosity, at 80° C., of 10 Pa.s is obtained.

Copolymer (A4)

The procedure described for copolymer (A3) is followed, except that the tetrahydrofurfur-2-yl acrylate is replaced by the same amount of 3-methoxybutyl acrylate.

The solvent is separated off in the manner described.

A copolymer (A4) having a K value of 28 and a melt viscosity, at 50° C., of 35 Pa.s is obtained.

Copolymer (A5)

160 parts of a monomer mixture of 380 parts of 2-ethylhexyl acrylate, 12.5 parts of acrylic acid, 45 parts of tetrahydrofurfur-2-yl acrylate and 62.5 parts of maleimido-N-hexanoic acid are added to a gently refluxing mixture of 100 parts of isopropanol and 2 parts of methyl ethyl ketone peroxide in the course of 15 minutes. After a further 15 minutes, the remainder of the monomer mixture is added in the course of 2 hours and stirring is continued for 30 minutes at the reflux temperature. Thereafter, a mixture of 8 parts of methyl ethyl ketone peroxide is added in the course of 1 hours and stirring is continued for a further 4 hours at the reflux temperature. The solvent and volatile components are distilled off under reduced pressure (0.1 bar) at 120° C. A copolymer (A5) having a K value of 20 and melt viscosity, at 80° C., of 9 Pa.s is obtained.

EXAMPLES 2 TO 5

For the tests, the following hotmelt contact adhesives are prepared by mixing benzophenone compounds with the melt of the copolymers (A2)-(A5).

TABLE 1

| Example | Copolymer [% by weight] | Benzophenone compound [% by weight] |
|---|---|---|
| 2 | 98.0 (A2) | 2.0 benzophenone |
| 3 | 97.0 (A3) | 3.0 benzophenone |
| 4 | 99.0 (A4) | 1.0 benzophenone |
| 5 | 97.0 (A5) | 3.0 4-hydroxybenzophenone |

The values measured for these materials after exposure to UV light (in the air) are summarized in Table 2 below:

TABLE 2

Results of the irradiation tests

| Example | Cohesion [hours] at 23° C. | at 50° C. | Peeling strength (after 24 hours) [N/2 cm] | Evaluation of the tack |
|---|---|---|---|---|
| 2 | >100 | >1 | 7.0 | Good tack |
| 3 | >100 | >2 | 8.0 | Good tack |
| 4 | >100 | >1 | 8.5 | Good tack |
| 5 | >100 | >5 | 10.5 | Good tack |

COMPARATIVE EXPERIMENTS 2 AND 3

For comparison, a copolymer which can be cast at room temperature and consists of 20% of vinyl acetate and 80% of n-butyl acrylate and has a K value of 19 (measured in 1% strength solution in ethyl acetate) is prepared according to the Example of DE-A 2 357 486, and 12 parts of 2-ethylhexyl acrylate and 10 parts of trimethylolpropane triacrylate are added. Part of the mixture is mixed with 2.2% by weight of benzophenone (Comparative Experiment 2) while the other part is mixed with 2.2% by weight of methylolbenzoin methyl ether (Comparative Experiment 3), the mixtures are applied in a thickness of 25 μm to polyethylene glycol terephthalate films and the adhesive properties are measured. The results are summarized in Table 3 below:

TABLE 3

Results of the Comparative Experiments

| Comparative Experiment | Cohesion [hours] at 23° C. | at 50° C. | Peeling strength (after 24 hours) [N/2 cm] | Tack |
|---|---|---|---|---|
| 2 | <0.1 | <0.1 | 6.5 | Greasy layer |
| 3 | <0.1 | <0.1 | 7.0 | Greasy layer |

EXAMPLES 6 AND 7

Preparation of copolymer (A6)

A mixture of 140 parts of toluene, 2.8 parts of methyl isobutyl ketone peroxide and 220 parts of a monomer mixture of 630 parts of 2-ethylhexyl acrylate, 2.5 parts of acrylic acid and 5.25 parts of tetrahydrofurfur-2-yl acrylate is refluxed. The remainder of the monomer mixture and, at the same time, a mixture of 50 parts of toluene and 10.5 parts of methyl isobutyl ketone peroxide are added to the refluxing mixture in the course of 2 hours and stirring is continued for a further 4 hours.

The solvent is then removed at 130° C. under reduced pressure. The copolymer (A6) has a K value of 27 and a melt viscosity (80° C.) of 25 Pa.s.

The solvent is removed at 100° C. under reduced pressure. The resulting copolymer (A7) has a K value of 32 and a melt viscosity (80° C.) of 35 Pa.s. Preparation and testing of the hotmelt contact adhesives of Examples 6 and 7.

For the preparation of the hotmelt contact adhesives, benzophenone and two polytetrahydrofuran di(meth)acrylates derived from polytetrahydrofuran having a mean molecular weight (number average) of 650 and of 2,000, respectively, i.e. poly-THF-650 diacrylate and poly-THF-2000 dimethacrylate, are added, the components being kneaded to a homogeneous mass in a heatable mixing unit at 100° C. The amounts in each case and the melt viscosities of the hotmelt contact adhesives are summarized in Table 3A below.

TABLE 3A

| Example | Copolymer (parts) | Poly-THF diacrylate (parts) | Benzo-phenone (parts) | Melt viscosity at 80° C. [Pa.s] |
|---|---|---|---|---|
| 6 | A6 95.0 | P-THF-650 5.0 | 0.25 | 20 |
| 7 | A7 90.0 | P-THF-2000 10.0 | 0.30 | 30 |

The hotmelt contact adhesive is used to coat films in a conventional manner, the coated films are exposed to UV light in the manner stated and the adhesive properties are then measured. These are then summarized Tables 4 and 5 below:

TABLE 4

Results of tests on adhesive properties
Coating: 25 g/m²; film: polypropylene film, 40 μm; irradiation in the air

| Example | Cohesion [hours] at 23° C. | at 50° C. | Peeling strength (after 24 hours) [N/2 cm] | Comments |
|---|---|---|---|---|
| 6 | >300 | >15 | 6.5 | Highly glossy, transparent coating |
| 7 | >300 | >15 | 7.0 | Highly glossy, transparent coating |

Preparation of copolymer (A8)

200 parts of a monomer mixture of 600 parts of n-butyl acrylate, 250 parts of 2-ethylhexyl acrylate, 100 g of methyl acrylate and 50 parts of N-2-tetrahydrofurfuryl methacrylamide are added to a mixture of 160 parts of ethyl acetate, 50 parts of tetrahydrofuran and 8 parts of cyclohxanone peroxide and initial polymerization is carried out under reflux for 20 minutes. In the course of a further 2 hours, the remainder of the monomer mixture and, at the same time, a solution of 8 parts of methyl ethyl ketone peroxide in 123 parts of ethyl acetate are added. After the end of the addition, stirring is continued for a further 4 hours at the reflux temperature. A copolymer having a K value of 35 is obtained.

The solvent mixture and volatile components are distilled off at 100° C., the pressure is reduced and the temperature is increased to 130° C. A copolymer having a melt viscosity of 8 Pa.s at 120° C. (D =100 l/s) is obtained.

0.75% by weight (based on resin) of benzophenone is stirred into the melt.

200 parts of the resin are removed and are mixed with 20 parts of a commercial tackifier (Foral 85 ® from Hercules Inc.).

On a heatable coating table, polyethylene glycol terephthalate films are coated with 25 g/m² of the copolymer at 110° C. The coatings are then irradiated in the air in the manner described, and the adhesive tests are carried out.

TABLE 5

Results of the tests on the adhesive properties

| Example | Cohesion [hours] at 23° C. | at 50° C. | Peeling strength (after 24 hours) [N/2 cm] | Comments |
|---|---|---|---|---|
| Copolymer A8 | >100 | >5 | 6.5 | Tacky |
| A8 + tackifier | >100 | >2 | 8.5 | Tacky |

We claim:

1. A hotmelt contact adhesive which is crosslinkable with ultraviolet radiation in the air and is based on
   (A) copolymers which have a K value of from 8 to 60 and are prepared by solution copolymerization of
      (a) from 0.1 to 20%, based on the weight of the copolymers, of tetrahydrofurfur-2-yl (meth)acrylate and/or N-2-tetrahydrofurfuryl (meth)acrylamide and/or alkoxyalkyl (meth)acrylates and/or N-alkoxyalkyl (meth)acrylamides,
      (b) from 44 to 99.9%, based on the weight of the copolymers, of monoolefinically unsaturated acyclic unsubstituted monocarboxylates of 3 to 12 carbon atoms, up to 20% by weight of which may be replaced by vinyl ethers of 3 to 20 carbon atoms, styrene, α-methylstyrene, vinyl chloride, vinylidene chloride and/or acrylonitrile,
      (c) from 0 to 30%, based on the weight of the copolymers, of monoolefinically unsaturated compounds of 4 to 25 carbon atoms having one or more ester, carboxamide or carboximide groups, one of which is adjacent to the olefinic double bond, and having 1 to 3 carboxyl groups, and
      (d) from 0 to 6%, based on the weight of the copolymers, of α,β-monoolefinically unsaturated mono- and/or di-carboxylic acids of 3 to 6 carbon atoms and/or their anhydrides
   at from 70° to 150° C. in the presence of from 0.25 to 10% by weight, based on the monomers, of a ketone peroxide as a polymerization initiator and from 15 to 200% by weight, based on the monomers, of inert solvents, and removal of the solvents during or after the polymerization, and
   (B) from 0.01 to 10% by weight, based on the sum of the components (A) and (B), of benzophenone and/or benzophenone derivatives.

2. A hotmelt contact adhesive as claimed in claim 1, wherein the copolymer (A) is prepared by solution copolymerization of
   (a) from 2 to 15%, based on the weight of the copolymer, of tetrahydrofurfuryl (meth)acrylate,
   (b) from 56 to 92.9%, based on the weight of the copolymer, of esters of (meth)acrylic acid and alkanols of 2 to 8 carbon atoms,
   (c) from 5 to 25%, based on the weight of the copolymer, of succinic monoesters of alkanediol mono(meth)acrylates and
   (d) from 0.1 to 4%, based on the weight of the copolymer, of acrylic and/or methacrylic and/or maleic acid and/or their anhydrides
   at from 80° to 110° C. in the presence of from 30 to 50% by weight, based on the monomers, of isopropanol and/or isobutanol.

3. A hotmelt contact adhesive as claimed in claim 1, which contains, as component (B), from 0.5 to 5% by weight, based on the components (A) and (B), of benzophenone, a hydroxybenzophenone and/or a benzophenonecarboxylic acid.

4. A hotmelt contact adhesive as claimed in claim 1, which contains from 1 to 25%, based on the weight of the said adhesive, of (C) olefinically unsaturated polyethers and/or polyesters having a mean molecular weight (number average) of from 250 to 5,000.

5. A hotmelt contact adhesive as claimed in claim 4, which contains a diolefinically unsaturated polytetrahydrofuran as the polyether.

* * * * *